Jan. 22, 1924.  
C. W. BECK  
STEERING WHEEL  
Original Filed Sept. 20, 1922  
1,481,531

Inventor  
Charles W. Beck

By Whittemore Hulbert Whittemore  
+Belknap   Attorneys

Patented Jan. 22, 1924.

1,481,531

UNITED STATES PATENT OFFICE.

CHARLES W. BECK, OF DETROIT, MICHIGAN, ASSIGNOR TO BECK-FROST CORPORATION, OF DETROIT, MICHIGAN, A CORPORATION OF MICHIGAN.

STEERING WHEEL.

Original application filed September 20, 1922, Serial No. 589,475. Divided and this application filed May 21, 1923. Serial No. 640,589.

*To all whom it may concern:*

Be it known that I, CHARLES W. BECK, a citizen of the United States of America, residing at Detroit, in the county of Wayne and State of Michigan, have invented certain new and useful Improvements in Steering Wheels, of which the following is a specification, reference being had therein to the accompanying drawings.

This invention relates to steering wheels for motor vehicles, boats and the like and particularly to wheels wherein the spider or metal part is of a built-up and assembled type.

An object of the invention is to provide a steering wheel in which the metal parts of the spider are rigidly secured together by simple and effective means.

Another object is to provide a strong and durable wheel which is simple in construction and which can be manufactured at a comparatively low cost.

With the above and other objects in view, the invention consists in certain novel features of construction, combination and arrangement of parts, as will be more fully described and particularly pointed out in the appended claims.

This application is a division of my co-pending application, Serial No. 589,475 filed September 20, 1922 for steering wheel and method of forming the same.

Figure 1:
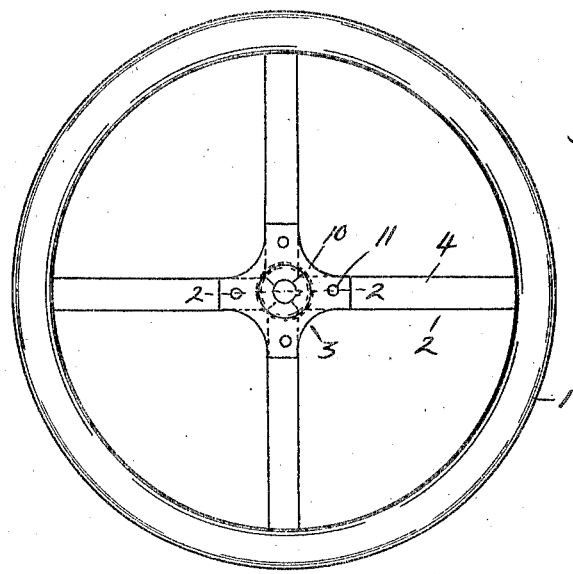
Figure 1 is a top plan view of a steering wheel embodying my invention.
Figure 2:
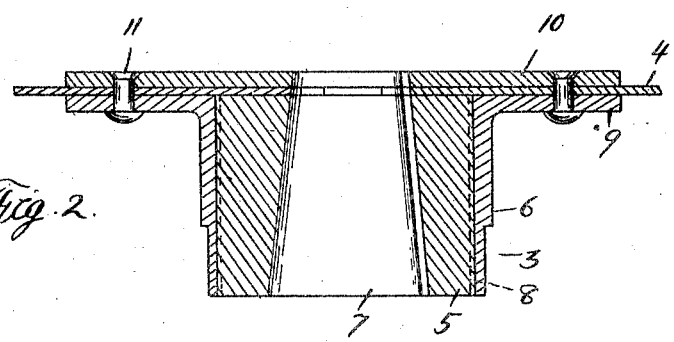
Figure 2 is a sectional view taken on line 2—2 of Figure 1.
Figure 3:
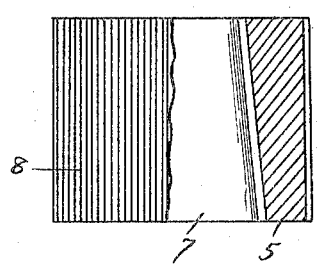
Figure 3 is a detail sectional view of the steel core.

Referring now to the drawing in which like characters of reference designate corresponding parts throughout the several views, the numeral 1 designates a rim, preferably of wood, supported upon a metallic spider 2 which includes a hub 3 and a plurality of radially extending arms 4.

The hub 3 is preferably formed of two parts that are rigidly secured together and includes a core 5 which is preferably cylindrical in form and which has a pressed fit within a cylindrical shell or casing 6. To insure a rigid joint between the core 5 and the shell 6 the outer surface of the core is preferably provided with a series of parallel ribs 8 which extend longitudinally thereof and which are embedded in the inner walls of the cylindrical shell. The core 5 is preferably formed of cold-rolled steel and is provided with a tapering bore 7 to receive the steering stem (not shown) while the shell 6 is preferably a metal stamping and is preferably provided at its upper end with a series of radially extending projections 9 upon which the inner ends of the arms rest.

For concealing the joints between the inner ends of the arms and for reinforcing the spider construction, I preferably provide a top plate 10 which preferably conforms in shape to the upper surface of the hub piece and which is preferably secured to the radially extending projections 9 and arms 4 by means of rivets 11.

In the process of construction, the core 5 is forced into the cylindrical shell while the latter is heated so that upon contraction thereof the ribs 8 will become firmly embedded in the inner walls of the shell and the parts will be rigidly secured together.

While it is believed, that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:—

1. A steering wheel comprising a hub including a core having a bore, ribs formed on said core, a shell gripping said core and ribs, radially extending projections on said shell, arms secured to said projections, and a rim carried by said arms.

2. A steering wheel comprising a hub, said hub including an outer shell and an inner core fitted therewithin, a plurality of arms secured to said shell, and a rim secured to said arms.

3. A steering wheel comprising a hub, said hub including a core having a bore, ribs formed on the core and an outer shell gripping said core and ribs, a plurality of arms secured to said shell, and a rim secured to said arms.

4. A steering wheel comprising a hub, said hub including an outer shell and an inner core having ribs embedded in the walls of said shell, a plurality of arms secured to said shell, and a rim secured to said arms.

5. A steering wheel comprising a hub, said hub including an outer shell and an inner core rigidly secured to said shell, a plurality of arms extending from said shell, arms secured to the arms aforesaid, and a rim secured to the last mentioned arms.

6. In a steering wheel, a metal hub, and a core having a pressed fit within said hub.

7. In a steering wheel, a metal hub, and a core of different material having a pressed fit within said hub.

8. In a steering wheel, a sheet metal hub, and a core of another material having projections embedded in the inner walls of said hub, said core having a bore receiving a steering shaft.

In testimony whereof I affix my signature.

CHARLES W. BECK.